Feb. 5, 1946.    R. S. CURRY, JR    2,393,974
GYRO FLUX VALVE COMPASS SYSTEM
Filed March 21, 1942
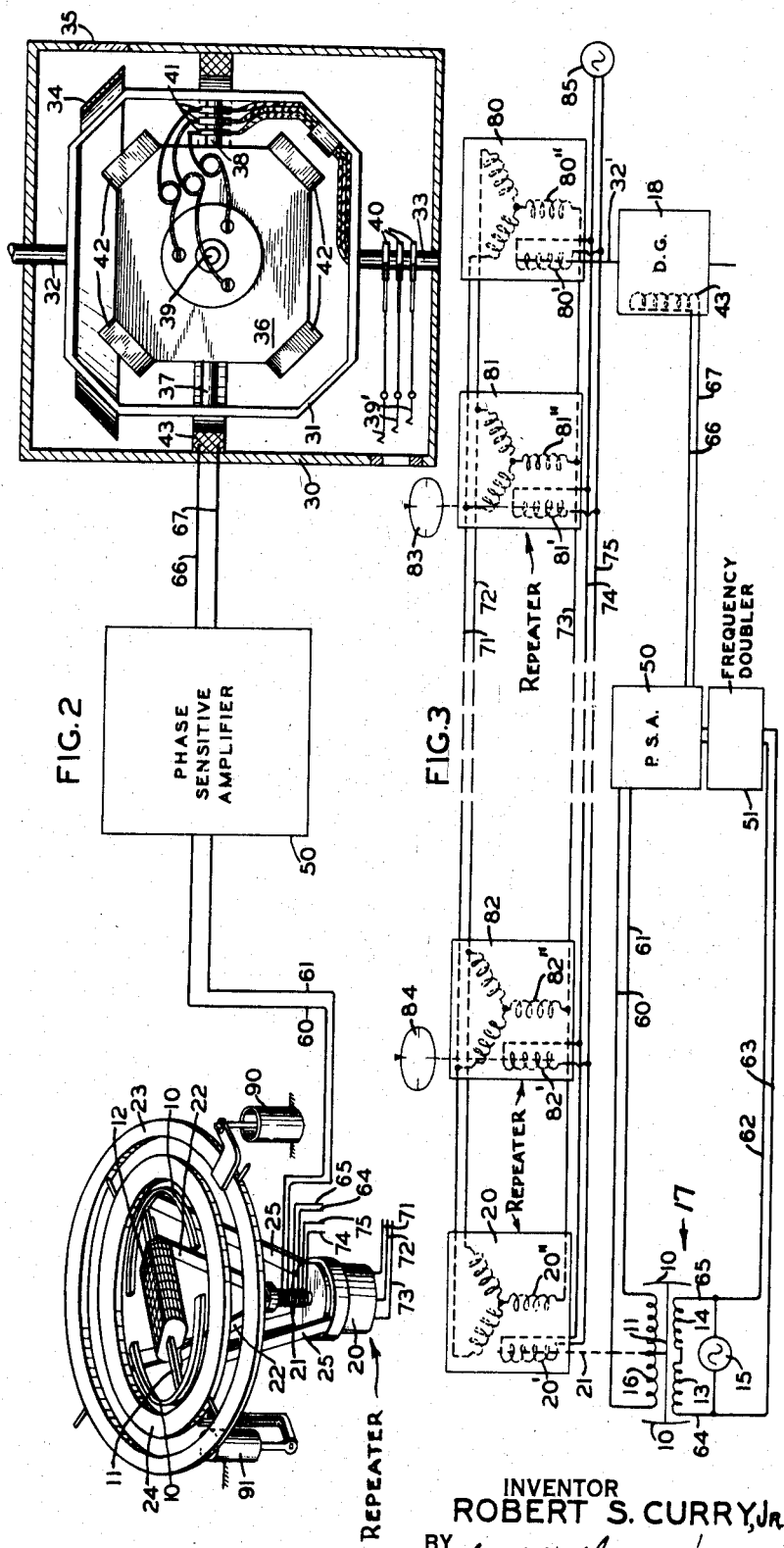
INVENTOR
ROBERT S. CURRY, Jr.
BY
his ATTORNEY.

Patented Feb. 5, 1946

2,393,974

UNITED STATES PATENT OFFICE 2,393,974

GYRO FLUX VALVE COMPASS SYSTEM

Robert S. Curry, Jr., Baldwin, N. Y., assignor to Sperry Gyroscope Company, Inc., Brooklyn, N. Y., a corporation of New York Application March 21, 1942, Serial No. 435,625

12 Claims. (Cl. 33—204)

This invention relates to a gyro flux valve compass system in which control over a directional gyro instrument is exercised by an earth's field-responsive flux valve.

An object of the invention is to provide a system of this character that maintains oriented relationship between the controlling and controlled types of instruments employed.

An important feature of the invention resides in the use of a rotatably mounted flux valve instrument which is positioned in azimuth by a distantly located directional gyro through electrical controlling means therefor.

A further feature of the invention consists in the incorporation in the system of one or more repeater compasses which are positioned in azimuthal agreement with the flux valve-controlled directional gyro.

Another important feature of the invention resides in the utilization of means responsive to a variation in the output of the flux valve due to a change in the azimuthal position of the same in the earth's field for effecting the desired control over the directional gyro instrument.

A still further feature of the invention consists in the mounting arrangement by which the flux valve element is rotatably positioned in azimuth and controlled by an electrical repeater.

Other objects, features and structural details of the invention will be apparent from the following description when read in connection with the accompanying drawing, wherein Fig. 1 is a partial wiring diagram and schematic view showing the component parts of the system and the electrical connections employed therefor.

Fig. 2 is a further schematic view showing in perspective the improved mounting for the flux valve and in side elevation the interior construction of the directional gyro, and Fig. 3 is a complete wiring diagram of the system as embodied in both Figs. 1 and 2.

In the drawing, Fig. 2, I show a flux valve of the two legged type employed as the controlling element of the improved gyro compass system. A flux valve of this kind is utilized in an illustrative manner only and it will be understood that the invention is not limited in use to a system employing this specific type of flux valve. Reference may be made to the copending application of Lennox F. Beach, filed July 31, 1941, Serial No. 404,809, in which there appears a complete description of the construction and operation of a two legged flux valve. In this invention, the flux valve comprises circularly shaped field collectors 10, mounted on the respective ends of a straight magnetic flux conducting core 11. Situated midway between the collectors 10 and encircling the core 11 is a coil element designated generally at 12. The coil element is constructed to include, in this instance, the opposed exciting or primary windings 13 and 14, Fig. 3, for the flux valve compass instrument, the same being energized from a suitable source of alternating current energy as indicated at 15. The controlling output of the flux valve is obtained from the secondary or pick-up winding indicated at 16. In Figs. 1 and 3 of the drawing, the flux valve or flux valve compass unit, as described, is designated by the reference number 17.

It will be understood that the output of the type of flux valve described varies as the instrument rotates in azimuth in the earth's magnetic field. When the core 11 is in a north-pointing position the output of the valve is at one of its maximum values and a variation or deviation of the compass from this position results in a decrease in the output of the instrument. Starting from a north-pointing position of the chosen type of flux valve and rotating the flux valve counter-clockwise, the output decreases until a point of zero output is reached as the valve passes through a west-pointing azimuthal position. Upon further rotation of the valve in the same direction, the phase of the output reverses and the output increases again until a south-pointing position of the valve is reached, in which position it is at the other of its maximum values but opposite in phase to that at the assumed starting position. Further movement of the flux valve is similar in character to that described, the phase of the output reversing as the flux valve passes through an east-pointing position and the output then increases until the starting position is reached. In accordance with the teaching of the present invention, the axis of core 11, in normal operating position, lies in an east-west plane, and the controlling flux valve is ineffective as long as the influenced oriented relation exists between it and a controlled instrument in the form of a directional gyro as indicated generally at 18 in Fig. 1 and there is continuity in the output of the compass. The system is rendered effective in response to a variation in the output of the flux valve due to a change in the azimuthal position of the same in the earth's field. Electrical means are included in the system whereby the rotatably mounted flux valve is maintained in oriented relation with the directional gyro instrument as hereinafter more particularly described.

The flux valve 17 is rotatably mounted in a horizontal plane as shown in Fig. 2. This mounting includes an azimuthal position repeater whose casing is indicated at 20. The rotor of the electrical repeater has an extending shaft 21 to which the core 11 of the flux valve is fixed by means of the V-shaped connecting arms 22 which are constructed of relatively impermeable or non-magnetic material. Shaft 21 is located in a normally vertical position and the flux valve is mounted to move with the same. A universal mounting consisting of outer gimbal ring 23 and inner gimbal ring 24, whose respective axes are arranged in mutually perpendicular relation, is provided for the compass or flux valve and the repeater, the same being pendulously supported therein by means of the three extending arms 25, in this instance, which connect the inner gimbal ring 24 and the casing 20 of the electrical repeater. The arms 25 extend from a ring shaped piece which engages the casing 20 of the repeater and are joined at their equidistantly spaced opposite ends to the bottom of the inner gimbal ring 24.

Means for damping the mounting are provided in the present instance by dash pot members 90 and 91. Slip ring connections may be employed as shown in Fig. 2 on the shaft 21 to permit the exciting energy for the flux valve unit to be introduced therein, to permit the output signal to be led therefrom and to enable the required energy to be supplied to the winding of the rotor for the repeater. The leads to the slip rings are made flexible and the weight of the same is negligible when compared with the weight of the repeater casing 20 which acts as a pendulous weight in the provided mounting.

The flux valve controlled instrument is a directional gyro of conventional form as shown in Fig. 2. The casing 30 of the directional gyro, as herein illustrated, is provided with a window 35, and within said casing is located a vertical ring 31 which is pivotally mounted on a vertical axis by means of trunnions 32 and 33. A compass card 34 is situated on the vertical ring 31 and is observable through the window 35 in the casing 30 which encloses the operating parts of the instrument. The sensitive element or gyro rotor (not shown) of the instrument is mounted within a rotor bearing case 36 which in turn is pivotally mounted on a horizontal axis on the vertical ring 31 by means of trunnions 37 and 38. The spin axis of the gyro rotor is normal to the plane of the paper, as viewed in Fig. 2, the position of the same being indicated by the extending shaft 39. In the form of directional gyro instrument illustrated, the gyro rotor is spun electrically by a suitable driving motor (not shown) provided within the rotor bearing case 36. Alternating current energy is provided to spin the gyro rotor from the source 15 by way of a jack connection 39' and cooperating groups of slip rings 40 and 41 which are respectively located on trunnions 33 and 38.

The control of the flux valve 17 over the directional gyro 18 is exerted through a precessing means for changing the azimuthal position of the gyro shown by the compass card 34 or the position of the vertical ring 31 with respect to the earth's magnetic field. The precessing means in conventional manner exerts a torque about the horizontal axis of the gyro rotor bearing case 36 and consequently effects a desired movement of the vertical ring 31. The precessing means is electromagnetic, in the instant case, the same including permanent magnet elements 42 which are fixed in position on the rotor bearing case 36 and a stationary centrally located coil 43 which encircles the vertical ring 31 of the instrument and is fixed to the interior surface of the case 30. Control over the precessing means for the directional gyro instrument may be exerted by the flux valve 17 through a phase sensitive amplifier of conventional form and indicated generally at 50. Other devices of similar character or means responsive to a variation in the output of the flux valve 17 due to a change in the azimuthal position of the same in the earth's field to obtain the desired result may be employed in this connection without departing from the inventive concepts herewith disclosed. In the present instance, the output of phase sensitive amplifier 50 controls the direction of the magnetic field set up by the coil 43 and hence determines the direction in which the precession-effecting torque is applied, the same resulting in a movement of the vertical ring of the directional gyro which will restore the flux valve to its original position in azimuth or to that position from which the change in continuity of the output of the flux valve, which resulted in the operation of the system, started. As shown in Figs. 1 and 3, the phase sensitive amplifier may be energized from the current source 15 through a suitable frequency doubler element indicated at 51. A suitable amplifier circuit may be employed which obviates the need of the frequency doubler 51, if desired. The output of the secondary winding 18 of the flux valve 17 is led to the phase sensitive amplifier 50 by way of leads 60 and 61. Leads 62 and 63 connect the source 15 and frequency doubler 51 employed, in this instance, and leads 64 and 65 connect the primary or exciting windings of the flux valve with the source 15. The output of the phase sensitive amplifier 50 is led to coil 43 of the gyro-precessing means by way of leads 66 and 67. Leads 68, 69 and 70 from the source 15 are provided to supply the energy necessary to spin the gyro rotor of the directional gyro employed in the instant system.

By way of example, the phase sensitive amplifier, which may be employed in this invention, may comprise a circuit including two stages of voltage amplification for gain and a phase discriminating stage which may include a twin triode tube to the plates of which is supplied alternating current energy from a suitable frequency doubler. The precessing coil 43 is connected across the plates of said tube. A full wave rectifier, which is connected to the source of alternating current energy employed to energize the exciting winding of the flux valve, and a voltage doubler are preferably employed both to supply the direct current plate voltage for the amplifier tubes and also, through modulation by the energy from the said alternating current energy source, to supply double frequency alternating current energy, which will be of the same frequency as that of the output from the flux valve, to the phase discriminating stage of the amplifier.

The improved system further includes an electrical means for maintaining an oriented relation between the preferably spaced directional gyro 18 and the flux valve 17. This means includes a position-indicating transmitter designated generally at 80, Figs. 1 and 3, and the repeater device whose casing is indicated at 20. Other repeaters such as those indicated at 81 and 82 may be included in this portion of the system, the same being employed to position repeater compass cards designated at 83 and 84, respectively, which are controlled by the directional gyro. The particular position-repeating means illustrated in the drawing is provided by a "Selsyn" transmitter and receiver arrangement which is energized from a separate source of alternating current energy as indicated at 85. The transmitter "Selsyn" 80 and the repeater "Selsyns" designated generally in the drawing by the reference numbers 81, 82 and 20 have their respective rotor windings indicated at 80', 81', 82' and 20' connected in parallel relation and energized in common from the source. The Y connected stator windings for each of the "Selsyns" 80, 81, 82 and 20 are joined in parallel relation by suitable connecting leads such as indicated at 71, 72, and 73, the windings proper being shown at 80'', 81'', 82'', and 20'', in Fig. 3. Leads 74 and 75 are provided for supplying energy from source 85 to the respective rotors 80', 81', 82', and 20'. As should be well understood in the art, the rotor 20', 82', and 81', of this transmitter-receiver arrangement repeats the azimuth position, in this instance, of the transmitter rotor 80' which is determined by the position of the vertical ring 31 of the directional gyro. In the construction shown, trunnion 32 is adapted to extend exteriorly of the casing 30, as designated at 32', Figs. 1 and 3, and is directly employed to position the rotor 80' of the transmitter 80. Other means for accomplishing this purpose may obviously also be employed without departing from the present inventive concepts. As previously described, the flux valve 17 is positioned in azimuth by means of the extending shaft 21 of the gyro position-repeating rotor 20' of the primary receiver of the arrangement. Also, the position of the repeater compass cards 83 and 84, controlled from the rotors 82' and 81', repeat the azimuthal position of the flux valve-controlled directional gyro. The transmitter-receiver arrangement described, or other equivalent devices for the purpose, tends to maintain the directional gyro and the flux valve in predetermined orientated relation.

If while the vehicle on which the system is utilized is maintaining a particular straight course or heading and, because of undesired movement in the gyro, the flux valve is caused to change its azimuthal position, the system is then rendered effective to correct this deviation and restore the flux valve to its original position. This action is obtained because of variation in the output of the flux valve and through means of the phase-sensitive amplifier 50 and its control over the gyro precessing means, a precessing torque being exerted on the bearing case 36 in a direction to correct the position of the vertical ring 31. This change is then repeated back to the flux valve by way of the described transmitter-receiver arrangement to obtain the desired correction in the position of the compass.

As many changes could be made in the above construction and many apparently widely different embodiments of this invention could be made without departing from the scope thereof, it is intended that all matter contained in the above description or shown in the accompanying drawing shall be interpreted as illustrative and not in a limiting sense.

What is claimed is:

1. A gyro flux valve compass system comprising a flux valve, means for rotatably supporting said flux valve, a directional gyro, precessing means for changing the azimuthal position of the gyro, electrical means controlled by the gyro and operable thereby in its azimuthal movement to position said rotatable flux valve in azimuthal agreement therewith, and means responsive to the output of said flux valve for controlling said precessing means for the gyro, whereby said gyro through the electrical means controlled thereby may restore the flux valve to its original position if said flux valve should depart therefrom.

2. A gyro flux valve compass system, as claimed in claim 1, in which said gyro controlled electrical means includes a repeater compass which is positioned in azimuthal agreement with the flux valve controlled directional gyro.

3. A gyro flux valve compass system, as claimed in claim 1, in which said precessing means is electromagnetic and the controlling means therefor includes a phase sensitive amplifier.

4. A gyro flux valve compass system comprising a flux valve, means for rotatably supporting said flux valve, a directional gyro, precessing means for changing the azimuthal position of the gyro, electrical means for maintaining the directional gyro and flux valve in oriented relationship including a transmitter controlled by the gyro and a receiver for positioning said flux valve, and means responsive to the output of said flux valve for controlling said precessing means for the gyro, whereby said transmitter-receiver electrical means may restore the flux valve to its original position if said flux valve should depart therefrom.

5. A gyro flux valve compass system, as claimed in claim 4, in which said precessing means is electromagnetic and includes a stationary coil for said directional gyro and the controlling means therefor includes a phase sensitive amplifier the output of which is fed to the stationary coil.

6. A gyro flux valve compass system, as claimed in claim 4, in which the electrical receiver includes an extending shaft on which the flux valve is positioned, and the receiver and flux valve are pendulously mounted on a universal support.

7. A gyro flux valve compass system comprising a flux valve, means for rotatably supporting said flux valve, a directional gyro including a vertical ring and a gyro rotor bearing frame pivotally mounted on a horizontal axis on said ring, a position repeating electrical transmitter-receiver arrangement for maintaining the gyro and flux valve in oriented relationship, means for positioning the transmitter from the vertical ring of the gyro, means for correspondingly positioning the flux valve from the rotor of the receiver, precessing means for changing the azimuthal position of the vertical ring of the gyro, and means responsive to the output of said flux valve for controlling said precessing means for the gyro, whereby said transmitter-receiver arrangement may restore the flux valve to its original position if said flux valve should depart therefrom.

8. A gyro flux valve compass system, as claimed in claim 7, in which a repeater compass is also controlled from the transmitter of the transmitter-receiver arrangement.

9. A gyro flux valve compass system, as claimed in claim 4, in which the electrical means for maintaining the directional gyro and flux valve in oriented relationship is provided by a "Selsyn" transmitter-reeciver arrangement.

10. The combination of a flux valve, an azimuthal position, electrical, repeater having a vertically extending rotor shaft on which the flux valve is fixed, and a universal support in which the repeater and flux valve are pendulously mounted.

11. The combination of a flux valve, an azimuthal position, electrical, repeater having a vertically extending rotor shaft on which the flux valve is mounted for movement therewith, a universal mounting, and means for connecting the repeater to the universal mounting whereby said repeater and the flux valve therewith are pendulously supported.

12. A gyro flux valve compass system comprising a flux valve, means for rotatably supporting said flux valve, a directional gyro, precessing means for moving the gyro in azimuth, electrical means controlled by the gyro and operable thereby in its azimuthal movement to move said flux valve in azimuth, and means responsive to the output of said flux valve for controlling said gyro-precessing means, whereby a predetermined azimuthal orientation of said flux valve and gyro will be maintained.

ROBERT S. CURRY, Jr.